Feb. 18, 1964    H. J. IFFLAND, JR., ET AL    3,121,291
FISHING APPARATUS
Filed Jan. 8, 1963
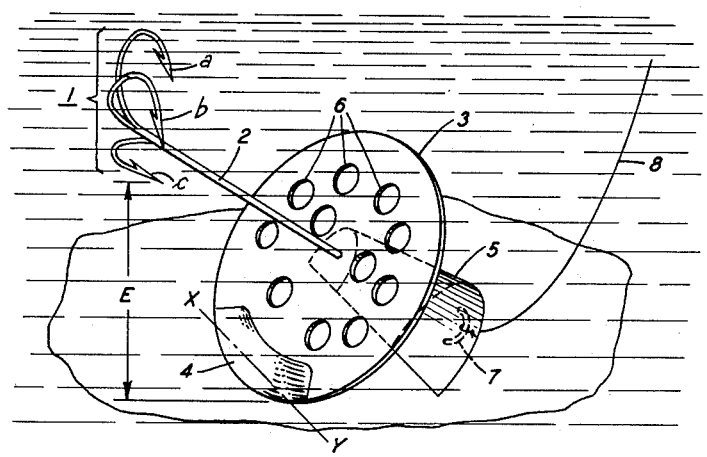
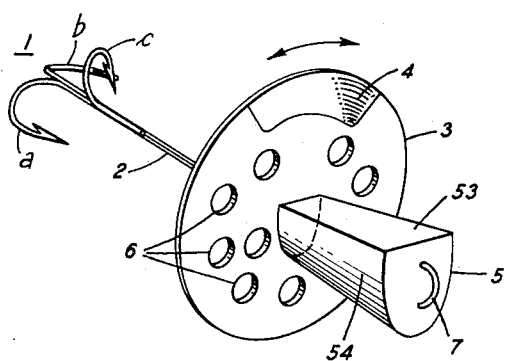
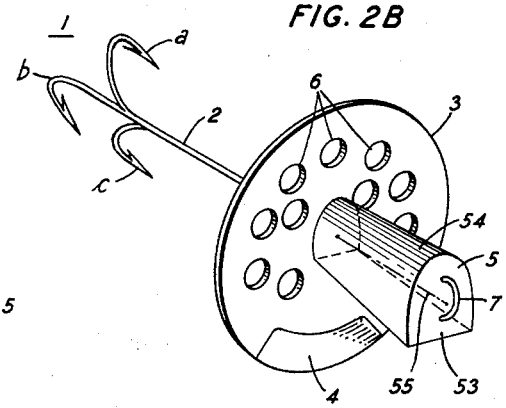
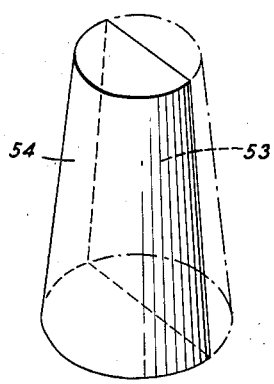
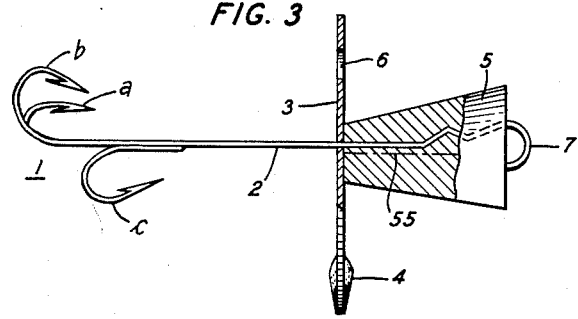
INVENTORS: HENRY J. IFFLAND, JR.
STEVE J. LETOSTAK
BY Jules P. Kirsch
ATTORNEY

United States Patent Office 3,121,291
Patented Feb. 18, 1964

3,121,291
FISHING APPARATUS
Henry J. Iffland, Jr., 28 New York Ave., and Steve J. Letostak, 154 Martin Drive, both of South Plainfield, N.J.
Filed Jan. 8, 1963, Ser. No. 250,095
5 Claims. (Cl. 43—44.81)

This invention relates to fishing apparatus, and in particular to apparatus for catching fish in close proximity to the bottom of a body of water.

In order to catch fish in close proximity to the bottom of a body of water, it is well known that the fishhook employed in this kind of fishing must be kept clear of the bottom, primarily to prevent obstruction of the hook. Obstruction of the hook may arise from a number of causes; for example, the bottom may be composed of relatively soft substances in which an ordinary hook will tend to embed itself, or various objects lying on the bottom may entangle the hook. Several devices for catching fish at the bottom have been constructed in which a fishhook is maintained at a predetermined elevation above the bottom in order to prevent obstruction of the hook; one such device is described by A. A. Kruze in Patent 2,651,136, issued September 8, 1953.

It has been observed, however, that obstruction of the fishhook is not the only important problem to be overcome in attempting to catch fish at the bottom of a body of water. In particular, another important problem is that of instability of the fishhook due to various forces in the vicinity of the bottom; for example, water currents may move the fishhook from a desirable fishing area to an area devoid of fish, which then makes it necessary for the fisherman to draw in his line and cast again in the desirable fishing area. Further, instability becomes important when a fishhook of special configuration is employed for catching fish at the bottom, because for maximum effectiveness it is necessary that such a hook be maintained at a preferred position.

The present invention provides fishing apparatus adapted to catch fish at or near the bottom of a body of water which substantially avoids both the risk of obstruction and the risk of instability of the fishhook. The apparatus of this invention comprises a unitary structure including a fishhook, a perforated disk with a weighted annular sector, and a sinker constructed to resemble a selected portion of a truncated cone having a longitudinal surface comprising two regions: a curved surface region and a flat surface region. The shank of the fishhook is joined to the sinker through the center of the disk, and the top surface of the sinker is attached to the central portion of the disk so that the flat longitudinal surface region of the sinker faces the weighted annular sector of the perforated disk. As a result of this arrangement of the disk and the sinker, the unitary apparatus of this invention has a single, highly stable position for resting upon the bottom of a body of water, in which both the edge of the disk corresponding to the weighted annular sector and a portion of the flat longitudinal surface region of the sinker rest upon the bottom. In any other position, the present apparatus is so unstable that it will roll upon the edge of the disk and a portion of the curved longitudinal surface portion of the sinker until the apparatus comes to rest in its highly stable position. Stability of this apparatus is further aided by the perforations in the disk, which decrease the resistance of the apparatus to water currents, and by the combined weight of the sinker and the weighted annular sector of the disk, which tends to embed the apparatus in the bottom.

In addition, the sinker element of this invention is made sufficiently heavy with respect to the fishhook element so that when the sinker rests upon the bottom, the disk acts as a fulcrum to elevate the fishhook above the bottom and thereby prevent obstruction of the hook. A feature of this invention is the relatively wide range of elevations available for the fishhook element of the apparatus, the exact amount of elevation being determined by the diameter chosen for the perforated disk.

The invention will be fully understood from the following detailed description of illustrative embodiments thereof taken in connection with the appended drawings, in which:

FIG. 1 is a front perspective view showing the apparatus of this invention in its stable position upon the bottom of a body of water;

FIG. 2A is a rear perspective view showing the apparatus of this invention in an unstable position upon the bottom of a body of water;

FIG. 2B is a rear perspective view showing the apparatus of this invention in its stable position upon the bottom of a body of water;

FIG. 3 is a side view showing in longitudinal section the perforated disk and sinker elements of this apparatus; and FIG. 4 is a perspective view of a geometrical figure illustrating a preferred structure for the sinker element of the present invention.

Structural Features

Referring first to FIG. 1, this drawing illustrates the apparatus of this invention resting upon the bottom of a body of water in its highly stable position. FIG. 1 also illustrates that the apparatus of this invention is a unitary structure, one end of which is provided with an eye 7 for securing the apparatus to a fishing line 8.

The sinker element of the present invention, which is denoted as element 5 in the drawings, is rigidly joined to the central portion of perforated disk 3 and the shank portion 2 of fishhook 1. One suitable means for securing sinker 5 to disk 3 is by brazing (not shown), and hook 1 may be joined to sinker 5 by extending shank 2 through the center of disk 3 and substantially along the interior longitudinal axis 55 of sinker 5 to form eye 7 at the base of sinker 5 in the fashion shown in FIG. 3.

The present invention is made highly stable in a single position and relatively unstable in any other position by constructing disk 3 and sinker 5 in the following manner. Disk 3 may be formed of any one of a number of materials, for example, a material resistant to corrosion such as brass, and any suitable diameter may be chosen for disk 3, the exact diameter depending upon the elevation at which it is desired to maintain hook 1 above the bottom. Disk 3 is weighted by constructing a selected annular sector 4 of the disk of a relatively dense material; for example, a material such as lead or a lead alloy may be formed into an annulus and attached to the selected annular sector of disk 3. Additional stability, a segment of the weighted annular sector 4 may be removed, if desired, so that disk 3 is provided with a flat edge at the annular sector, as indicated by chord XY in FIG. 1.

Sinker 5, which may be composed of a relatively dense substance such as lead or a lead alloy, is shaped so that its base, to which eye 7 is attached, is larger than its top, and its longitudinal surface comprises a curved surface region 54 and a flat surface region 53, as illustrated in FIGS. 2A and 4. One illustration of a geometrical structure suitable for sinker 5 is the solid portion of the frustum of a cone shown in FIG. 4, which is obtained geometrically by passing a longitudinal plane through the truncated cone. Thus the longitudinal surface of the solid portion in FIG. 4 comprises a curved surface region 54 of the original truncated cone and a flat surface region 53 defined by the longitudinal plane of intersection. The truncated cone in FIG. 4 is shown as a truncated right cone, but a truncated oblique cone is also suitable; in addition, it is not necessary that the top and base of the truncated cone be circular as shown in FIG. 4, an elliptically shaped top and base also being suitable, as illustrated in FIGS. 1, 2A, and 2B. Further, the longitudinal plane of intersection need not intersect both the top surface and the base surface of a truncated cone, it being sufficient for the plane to interect the base surface only, so long as the resulting flat surface region 53 is large enough to provide a stable resting surface for the apparatus.

Referring back to FIG. 1, a single, highly stable position for the apparatus of this invention is obtained by joining the top of sinker 5 to the central portion of disk 3 so that the flat longitudinal surface region 53 of sinker 5 faces the weighted annular sector 4 of disk 3. As shown in FIG. 1 and in FIG. 2B, the single, highly stable position provided by this arrangement of sinker 5 and disk 3 is that position in which the apparatus makes contact with the bottom through weighted annular sector 4 of disk 3 and a portion of the flat longitudinal surface region 53 of sinker 5. The stability of the present invention in the position illustrated in FIGS. 1 and 2B is further increased by perforations 6 in disk 3 and the combined weight of sector 4 and sinker 5. The perforations 6 allow water to pass through disk 3, thereby decreasing the resistance of disk 3 to pressure from water currents, and the combined weight of sector 4 and sinker 5 tend to embed a portion of disk 3 and sinker 5 in the bottom.

If desired, the apparatus of this invention may be formed by means of a die or mold constructed in accodance with the structure described above and illustrated in the drawings. Thus such a mold or die is designed to produce a unitary apparatus in which shank 2 of fishhook 1 is in substantial alignment with the longitudinal axis 55 of sinker 5, and the central portion of disk 3 is interposed between shank 2 and the top surface of sinker 5 so that shank 2 is perpendicular to disk 3 and flat surface region 53 of sinker 5 faces weighted annular sector 4.

*Operation*

It is an important feature of this invention that in addition to being provided with a single, highly stable position, it tends to move into this highly stable position from any other position in which it might land on the bottom after casting. This feature is obtained by making every other position of the apparatus relatively unstable so that in the event that the apparatus drops upon the bottom in any but its stable position, it will move immediately into the stable position. FIG. 2A illustrates a typical unstable position, in which the apparatus is shown landing upon the bottom with sector 4 and flat surface region 53 off the bottom. The double-headed arrow indicates that from this unstable position the apparatus will roll by the shortest route on the edge of disk 3 and on a portion of curved longitudinal surface 54 to the stable position shown in FIG. 2B. From a physical standpoint, this motion is due primarily to the gravitational force of the earth acting upon weighted sector 4, which causes the apparatus to rotate about its longitudinal axis toward its highly stable position.

Obstruction of hook 1 is prevented by the action of sinker 5 and disk 3 in elevating hook 1 above the bottom. Since the base of sinker 5 is larger than its top, and since sinker 5 is constructed to be substantially heavier than hook 1 and shank 2, disk 3 acts as a fulcrum to elevate hook 1 when the apparatus rests upon the bottom. The amount of elevation of hook 1, denoted E in FIG. 1, is determined primarily by the diameter of disk 3, and it is readily apparent that any one of a wide range of elevations may be obtained by selecting the proper diameter for disk 3.

The triple hook structure of hook 1 in the drawings is for purposes of illustration only, since the apparatus of this invention may be constructed with any desired hook or combination of hooks. However, hook 1 shown in the drawings does illustrate a situation in which stability is important, because for maximum effectiveness hooks $a$ and $b$ should point away from the bottom in the manner shown in FIG. 1. FIG. 2A shows a less effective position for hook 1, in which a single hook $c$ points away from the bottom, and the other two hooks $a$ and $b$ point toward the bottom.

It is to be understood that the above-described arrangements are merely illustrative of applications of the principles of this invention. Numerous other arrangements may be devised by those skilled in the art without departing from the spirit and scope of the invention.

What is claimed is:

1. Unitary fishing apparatus having a predetermined single highly stable position for resting upon the bottom of a body of water, and being so unstable in any other position on said bottom that said apparatus tends to move from any unstable position to said stable position, which comprises a fishhook connected through the center of a perforated disk having a selected single weighted annular sector extending less than half the circumference of said disk and an unweighted annular sector extending more than half the circumference of said disk to a sinker substantially resembling a truncated cone having a top surface, a base surface, and a longitudinal surface, in which a portion of said longitudinal surface of said truncated cone has been removed to make its longitudinal surface comprise a longitudinal curved surface region and a longitudinal plane surface region, said top surface of said sinker being in rigid contact with the central portion of said perforated disk so that the longitudinal plane surface region of said sinker faces said selected single weighted annular sector of said disk and the longitudinal curved surface region of said sinker faces said unweighted sector of said disk, wherein said predetermined single highly stable position of said apparatus is that single position in which a portion of the edge of said selected single weighted annular sector of said disk and a portion of said longitudinal plane surface region of said sinker rest upon said bottom, and wherein said apparatus is unstable when any portion of the edge of said unweighted annular sector of said disk and said longitudinal curved surface region of said sinker are in contact with said bottom so that said apparatus will roll upon the edge of said unweighted annular sector of said disk and upon said longitudinal curved surface region of said sinker from any unstable position to said predetermined single highly stable position.

2. Integral fishing apparatus for catching fish in close proximity to the bottom of a body of water, said apparatus having a predetermined single highly stable position for resting upon said bottom and being so unstable in any other position on said bottom that said apparatus tends to move from any unstable position to said stable position, which comprises a fishhook including a hook portion and a shank portion, a perforated disk having a selected single weighted annular sector extending less than half the circumference of said disk and an unweighted annular sector extending more than half the circumference of said disk, a sinker with a shape substantially resembling a frustum of a cone having a top surface, a base surface, and a longitudinal surface, in which a portion of said longitudinal surface of said frustum has been removed to make the longitudinal surface of said frustum comprise a curved surface region and a plane surface region, and means for rigidly joining together said fishhook, said perforated disk, and said sinker to form a unitary structure including means for joining the shank of said fishhook to said sinker through the center of said disk and through the central portion of said sinker so that said hook portion extends away from said top surface of said sinker in a predetermined position with respect to said longitudinal plane surface region of said sinker, and means for attaching the top surface of said sinker to the central portion of said disk so that the longitudinal plane surface region of said sinker faces said selected single weighted annular sector of said disk and the longitudinal curved surface region of said sinker faces said unweighted portion of said disk, wherein said predetermined single highly stable position of said apparatus is that single position in which a portion of the edge of said selected single weighted annular sector of said disk and a portion of said longitudinal plane surface region of said sinker rest upon said bottom, and wherein said apparatus is unstable when any portion of the edge of said unweighted annular sector of said disk and said longitudinal curved surface region of said sinker are in contact with said bottom so that said apparatus will roll upon the edge of said unweighted annular sector of said disk and upon said longitudinal curved surface region of said sinker from any unstable position to said predetermined single highly stable position.

3. Fishing apparatus having a predetermined single highly stable position to rest upon the bottom of a body of water for maintaining a fishhook at a predetermined single highly stable elevation above said bottom of said body of water, said apparatus being so unstable in any position on said bottom except said stable position that said apparatus tends to move from any unstable position to said stable position, which comprises a fishhook having a shank portion and a plurality of hooks, a perforated disk having a selected single weighted annular sector composed of a relatively dense material extending less than half the circumference of said disk and an unweighted annular sector extending more than half the circumference of said disk, a sinker shaped substantially to resemble a frustum of a cone which has been divided by a plane intersecting said frustum so that said sinker is bounded by a relatively small top surface, a relatively large base surface, and a longitudinal surface comprising a curved surface and a flat surface, and means for joining together said fishhook, said disk, and said sinker to form a unitary structure, including means for rigidly connecting the shank portion of said fishhook to said disk and to said sinker by passing the shank of said fishhook through the center of said disk and through the interior of said sinker substantially along the longitudinal axis of said sinker to form an eye at the base surface of said sinker and to position said plurality of hooks to extend away from said top surface of said sinker at a predetermined orientation with respect to said flat longitudinal surface of said sinker, and means for rigidly securing the top surface of said sinker to the central portion of said disk so that the flat longitudinal surface of said sinker is in alignment with said selected single annular weighted sector of said disk and the curved longitudinal surface of said sinker faces said unweighted portion of said disk, whereby in said predetermined single highly stable position of said apparatus both the edge of said selected single annular sector of said disk and a portion of said flat longitudinal surface of said sinker rest upon said bottom of said body of water to maintain the hook portion of said fishhook at said predetermined single highly stable elevation above said bottom, while in any other position both a portion of said curved longitudinal surface of said sinker and a portion of the edge of said unweighted annular sector of said disk make contact with said bottom so that said apparatus is unstable and rolls upon the edge of said unweighted annular sector of said disk and upon said curved longitudinal surface of said sinker to said predetermined single highly stable position.

4. Fishing apparatus having a predetermined single highly stable position for resting upon the bottom of a body of water and being so unstable in any other position upon said bottom that said apparatus tends to move from any unstable position to said stable position, which comprises a sinker constructed to resemble a frustum of a cone having a top surface, a base surface, and a longitudinal surface, in which a longitudinal portion of said cone has been removed so that the longitudinal surface of said sinker comprises a curved surface region and a flat surface region, a perforated disk attached by its central portion to the top surface of said sinker, said disk being provided with a selected single weighted annular sector which extends less than half the circumference of said disk and which is in alignment with said flat longitudinal surface region of said sinker and an unweighted annular sector which extends more than half the circumference of said disk and which is in alignment with said curved longitudinal surface region of said sinker, and a fishhook provided with a shank and three hooks each extending in a different direction from said shank and joined to the interior of said sinker through the center of said disk and through the top surface of said sinker so that in said predetermined single highly stable position of said apparatus said three fishhooks extend in a predetermined highly stable position away from said bottom of said body of water.

5. Unitary fishing apparatus having a predetermined single highly stable position for resting upon the bottom of a body of water and being so unstable in any other position upon said bottom that said apparatus tends to move from any unstable position to said stable position, which comprises a fishhook provided with a shank and a plurality of hooks each extending in a different direction from said shank, a sinker shaped substantially to resemble a frustum of a cone having a top surface, a base surface, and a longitudinal surface comprising a curved surface region and a flat surface region, and having said shank of said fishhook passing through said sinker in substantial alignment with the longitudinal axis of said sinker to extend said plurality of hooks at a predetermined position away from said top surface of said sinker, and a disk provided with a selected single weighted annular sector extending less than half the circumference of said disk and an unweighted annular sector extending more than half the circumference of said disk and interposed between the shank of said fishhook and the top surface of said sinker so that said shank and the longitudinal axis of said sinker are perpendicular to said disk at the central portion of said disk, and said longitudinal flat surface region of said sinker is in alignment with said selected single weighted annular sector of said disk and the longitudinal curved surface region of said sinker is in alignment with said unweighted portion of said disk, wherein said predetermined single highly stable position of said apparatus is that single position in which a portion of the edge of said selected single weighted annular sector of said disk and a portion of said longitudinal plane surface region of said sinker rest upon said bottom to extend said plurality of hooks in a predetermined highly stable position away from said bottom.

References Cited in the file of this patent

UNITED STATES PATENTS

| | | |
|---|---|---|
| 1,154,168 | Bosserman | Sept. 21, 1915 |
| 1,495,832 | Aiken | May 27, 1924 |
| 2,134,330 | Fink | Oct. 25, 1938 |
| 2,651,136 | Kruze | Sept. 8, 1953 |